United States Patent
Suzuki et al.

(10) Patent No.: US 11,397,431 B2
(45) Date of Patent: Jul. 26, 2022

(54) REMOTE DRIVING REQUEST PROCESSING DEVICE

(71) Applicant: TOYOTA JIDOSHA KABUSHIKI KAISHA, Toyota (JP)

(72) Inventors: Yuji Suzuki, Toyota (JP); Mutsumi Matsuura, Okazaki (JP); Tomoaki Miyazawa, Nagoya (JP); Toshiki Kindo, Yokohama (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/890,603

(22) Filed: Jun. 2, 2020

(65) Prior Publication Data
US 2021/0011470 A1 Jan. 14, 2021

(30) Foreign Application Priority Data
Jul. 10, 2019 (JP) .............................. JP2019-128765

(51) Int. Cl.
*G05D 1/00* (2006.01)

(52) U.S. Cl.
CPC ......... *G05D 1/0022* (2013.01); *G05D 1/0044* (2013.01); *G05D 1/0055* (2013.01)

(58) Field of Classification Search
CPC .. G05D 1/0022; G05D 1/0044; G05D 1/0055; G05D 2201/0213; G05D 1/0038; G05D 1/0253; G05D 1/0214; G05D 1/0223; G05D 1/0257; G05D 1/0276; G05D 2201/02
USPC .............................................................. 701/2
See application file for complete search history.

(56) References Cited

U.S. PATENT DOCUMENTS 10,328,897 B1 * 6/2019 Nabbe .................... B60K 28/06

FOREIGN PATENT DOCUMENTS

| CN | 103562680 | * | 6/2016 |
|---|---|---|---|
| JP | 2006-301723 A | | 11/2006 |
| JP | 2015-076027 A | | 4/2015 |
| JP | 2017-163253 A | | 9/2017 |
| JP | 2019-021200 | * | 2/2019 |

* cited by examiner

*Primary Examiner* — Muhammad Shafi
(74) *Attorney, Agent, or Firm* — Oliff PLC

(57) ABSTRACT

The likelihood of a remote driving request from a requester being unfulfilled is lowered. A server receives information regarding the remote driving request requesting a vehicle to travel by being remotely driven from a terminal of the requester, and receives information regarding a remote driving task selected by a remote driver (fulfilment agent) using a fulfilment agent operation terminal from the fulfilment agent operation terminal. A task corresponding to the received remote driving request is divided into plural remote driving tasks based on route information for the task, and information regarding at least one of the divided remote driving tasks is transmitted to the fulfilment agent operation terminal.

16 Claims, 4 Drawing Sheets

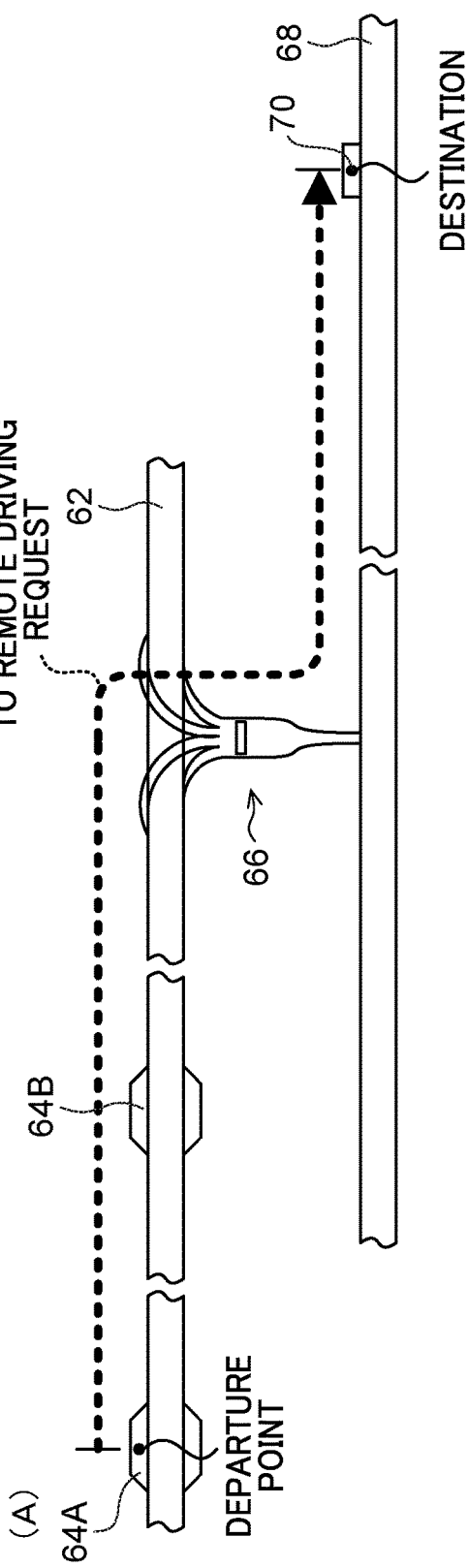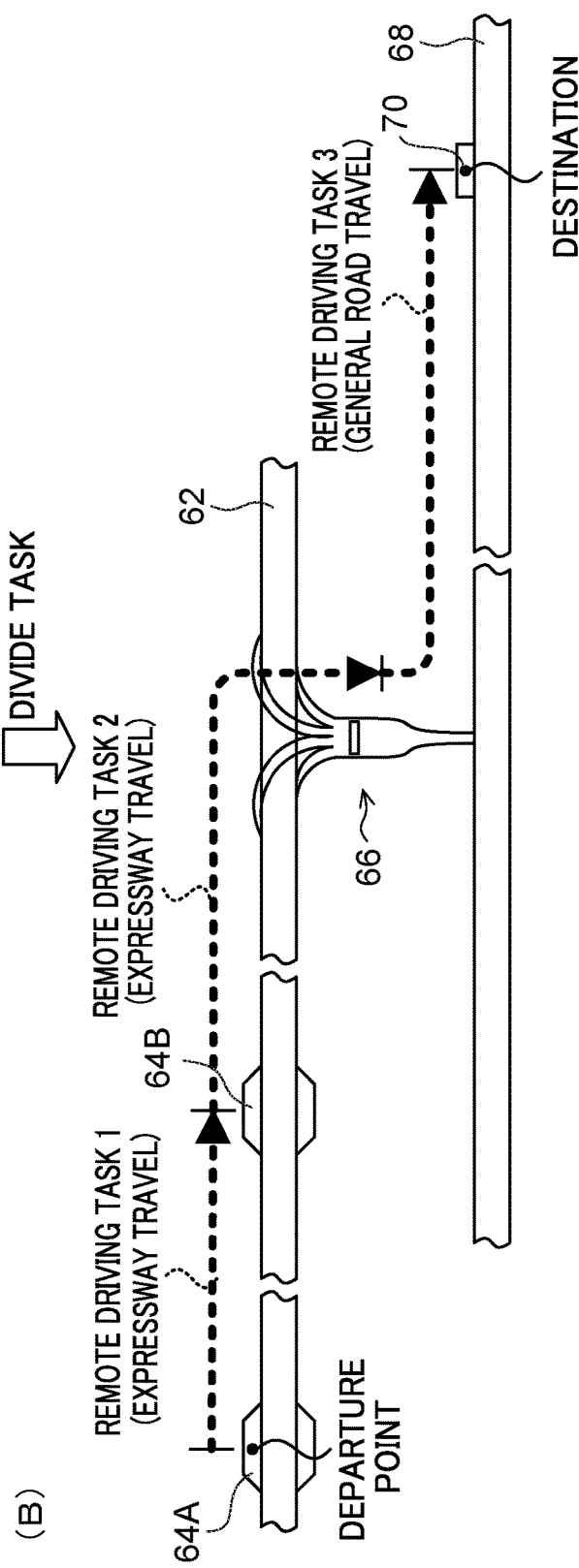
FIG.3

FIG.4

| TASK TYPE | TIME COMMITMENT | COMPENSATION | TASK CONTENTS | |
|---|---|---|---|---|
| REMOTE DRIVING TASK | TIME 1 TO TIME 2 | .. YEN | REMOTE DRIVING FROM POINT A TO POINT B | ACCEPT ~60 |
| REMOTE DRIVING TASK | TIME 2 TO TIME 3 | .. YEN | REMOTE DRIVING FROM POINT B TO POINT C | ACCEPT ~60 |
| REMOTE DRIVING TASK | TIME 3 TO TIME 4 | .. YEN | REMOTE DRIVING FROM POINT C TO POINT D | ACCEPT ~60 |

REMOTE DRIVING REQUEST PROCESSING DEVICE

CROSS-REFERENCE TO RELATED APPLICATION

This application is based on and claims priority under 35 USC 119 from Japanese Patent Application No. 2019-128765 filed on Jul. 10, 2019, the disclosure of which is incorporated by reference herein.

TECHNICAL FIELD

The present disclosure relates to a remote driving request processing device.

RELATED ART

Japanese Patent Application Laid-Open (JP-A) No. 2006-301723 (Patent Document 1) discloses technology in which an operator state is acquired while an operator is controlling a vehicle in the place of a vehicle user, and in cases in which the operator is determined to be unable to continue controlling the vehicle, control of the vehicle is switched to another operator.

If a vehicle is capable of traveling by remote driving, a situation is conceivable in which a remote driving request requesting remotely-driven vehicle travel from a start point to a finish point is received from a requester, and a task corresponding to the received remote driving request is executed by a remote driver. However, in cases in which there is no remote driver present who is capable of executing the task corresponding to the requested remote driving request from the start point to the finish point, the request of the requester may be unfulfilled.

SUMMARY

In consideration of the above circumstances, an object of the present disclosure is to obtain a remote driving request processing device capable of lowering the likelihood of a remote driving request from a requester being unfulfilled.

A remote driving request processing device according to a first aspect includes a reception section, a division section, and a transmission section. The reception section is configured to receive information regarding a remote driving request requesting a vehicle to travel by being remotely driven from a terminal of a requester, and to receive information regarding a remote driving task selected using a terminal of a remote driver from the terminal of the remote driver. The division section is configured to divide a task corresponding to the remote driving request received by the reception section into plural remote driving tasks based on route information for the task. The transmission section is configured to transmit information regarding at least one of the remote driving tasks divided by the division section to the terminal of the remote driver.

In the first aspect, the task corresponding to a remote driving request from the requester is divided into plural remote driving tasks, and information regarding at least one of the remote driving tasks is transmitted to the terminal of the remote driver. The divided remote driving tasks are more likely to be executed by the remote driver, thereby enabling the likelihood of the remote driving request from the requester being unfulfilled to be lowered.

A second aspect is the first aspect, wherein the division section divides the task corresponding to the remote driving request into plural remote driving tasks according to a category of road of travel based on the route information for the task.

Driving conditions of the vehicle differ according to the category of road, such as expressways or general roads. In the second aspect, the task corresponding the remote driving request is divided into the plural remote driving tasks according the category of road of travel. Since the driving conditions encountered in a single remote driving task are thereby constant, the burden on the remote driver executing the individual remote driving task can be alleviated.

A third aspect is the first aspect, wherein the division section divides the task corresponding to the remote driving request into plural remote driving tasks according to positions of potential stopping facilities on a road of travel based on the route information for the task.

In the third aspect, the task corresponding to the remote driving request is divided into the plural remote driving tasks according to the positions of potential stopping facilities on the road of travel. This enables a changeover between remote drivers to be performed safely in a state in which the vehicle has stopped at a potential stopping facility.

A fourth aspect is the first aspect, wherein the division section divides the task corresponding to the remote driving request into plural remote driving tasks according to administrative boundaries based on the route information for the task.

A fifth aspect is any one of the first aspect to the fourth aspect, wherein at a point in time when the remote driver has selected at least one out of the divided remote driving tasks based on the transmitted information regarding the remote driving tasks and a remote driver has been decided for all of the divided remote driving tasks, the transmission section notifies the terminal of the requester and the terminal of the remote driver that a contract has been entered into, and also commissions the remote driver that selected the remote driving task divided by the division section to execute the remote driving task according to a route sequence of the task.

A sixth aspect is any one of the first aspect to the fourth aspect, wherein at a point in time when the remote driver has selected at least one out of the divided remote driving tasks based on the transmitted information regarding the remote driving tasks and the remote driver has been decided for at least one out of the divided remote driving tasks, the transmission section notifies the terminal of the requester and the terminal of the remote driver that a contract has been entered into, and also commissions the remote driver that selected the remote driving task to execute the remote driving task.

A seventh aspect is the sixth aspect, wherein when the remote driver has been decided for at least a first remote driving task out of the divided remote driving tasks, the remote driver is commissioned to execute the first remote driving task, and a remote driver for a remote driving task for which a remote driver is yet undecided is decided in parallel with execution of the first remote driving task.

Advantageous Effects of Invention

The present disclosure exhibits an advantageous effect of enabling the likelihood of a remote driving request from a requester being unfulfilled to be lowered.

BRIEF DESCRIPTION OF DRAWINGS

FIG. 3 is an illustration to explain division of tasks and setting of remuneration; and FIG. 4 is an illustration illustrating an example of a presentation screen displayed on a display section of a fulfilment agent terminal.

DETAILED DESCRIPTION

Figure 1:
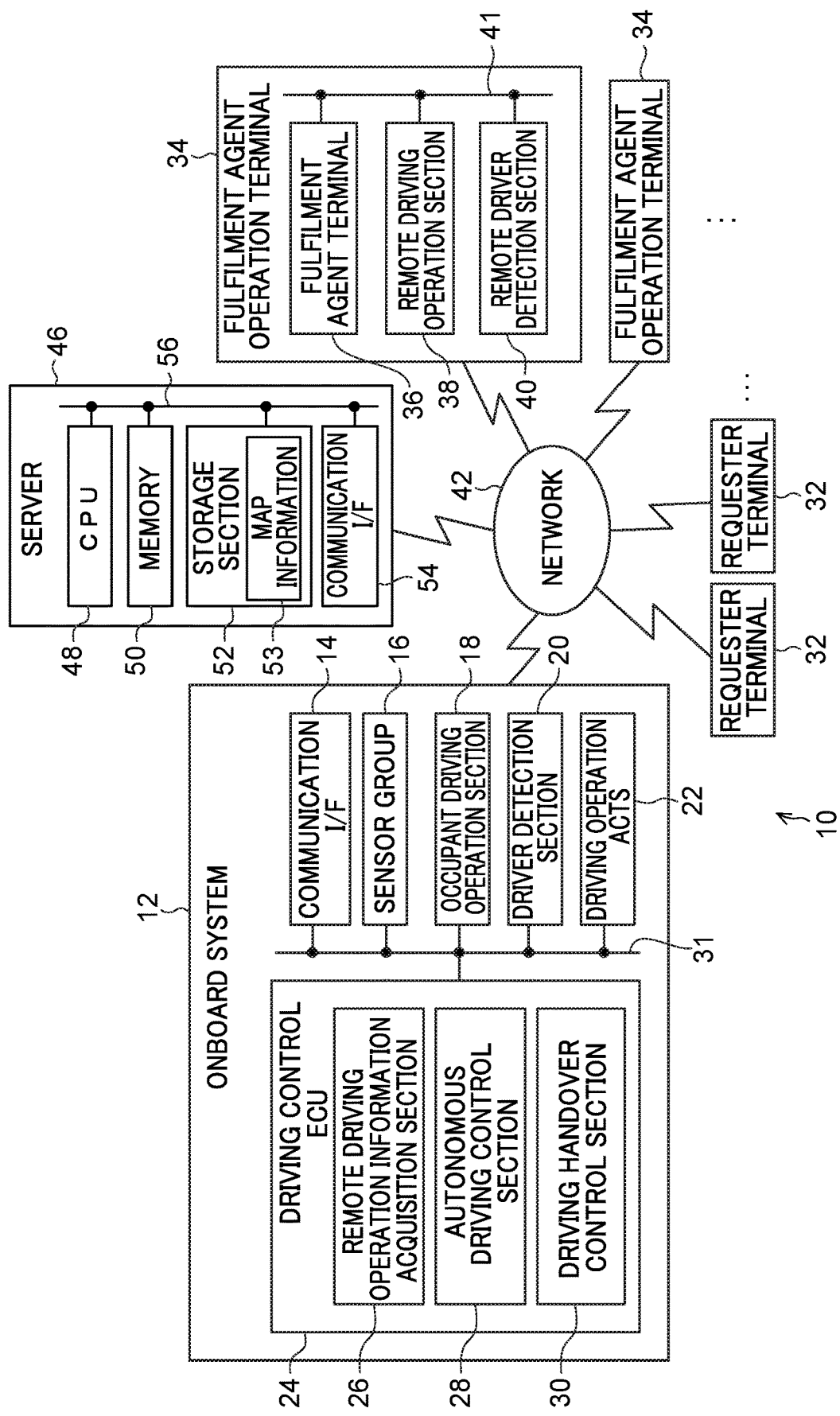
FIG. 1 is a block diagram illustrating a schematic configuration of a remote driving request processing system according to an exemplary embodiment.

Detailed explanation follows regarding an example of an exemplary embodiment of the present disclosure, with reference to the drawings. As illustrated in FIG. 1, a remote driving request processing system 10 according to an exemplary embodiment includes an onboard system 12 installed in a vehicle, plural requester terminals 32, plural fulfilment agent operation terminals 34, and a server 46. The onboard system 12, the requester terminals 32, the fulfilment agent operation terminals 34, and the server 46 are connected together so as to be capable of communicating with each other through a network 42.

Note that the vehicle installed with the onboard system 12 is provided with an occupant driving mode, a remote driving mode, and an autonomous driving mode as driving modes for driving the vehicle. The occupant driving mode is a mode in which a driver on board the vehicle drives the vehicle by operating an occupant driving operation section 18, described later. The remote driving mode is a mode in which a remote driver present outside the vehicle drives the vehicle remotely by operating a remote driving operation section 38, described later, of the corresponding fulfilment agent operation terminal 34. The autonomous driving mode is a mode in which the vehicle is driven (made to travel) autonomously by an autonomous driving control section 28, described later.

The onboard system 12 includes a communication interface (I/F) 14, a sensor group 16, the occupant driving operation section 18, a driver detection section 20, driving operation actuators (ACTs) 22, and a driving control electronic control unit (ECU) 24. These sections are connected together through a bus 31.

The communication I/F 14 of the onboard system 12 communicates with the fulfilment agent operation terminals 34, the server 46, and the like through the network 42. The sensor group 16 includes plural types of sensors that acquire information expressing a situation in the surrounding environment of the vehicle. The surrounding environment of the vehicle acquired by the sensor group 16 is employed during autonomous driving control by the autonomous driving control section 28, described later, and the like. Examples of the sensors included in the sensor group 16 include a Global Navigation Satellite System (GNSS) device, an onboard communication device, a navigation system, a radar device, and a camera.

The GNSS device measures the position of the vehicle by receiving GNSS signals from plural GNSS satellites. The measurement precision of the GNSS device improves the greater the number of GNSS signals it is able to receive. The onboard communication device is a communication device that performs at least one out of inter-vehicle communication with other vehicles, or road-to-vehicle communication with roadside devices, using the communication I/F 14. The navigation system includes a map information storage section stored with map information, and performs processing to display the position of the vehicle on a map and perform route guidance to a destination based on the position information obtained by the GNSS device and the map information stored in the map information storage section.

The radar device includes plural radars with different detection ranges to each other, detects objects such as pedestrians and other vehicles in the surroundings of the vehicle, and acquires the relative positions and relative speeds of the detected objects with respect to the vehicle itself. The radar device is also installed with a processing device that processes search results for such objects in the surroundings. The processing device eliminates noise, roadside objects such as guard rails, and so on from monitoring targets based for example on changes in the relative positions and relative speeds of the individual objects included in the several most recent search results, and performs tracking monitoring on monitoring target objects such as pedestrians and other vehicles. The radar device also outputs information relating to the relative positions and relative speeds of the individual monitoring target objects. The camera images the surroundings of the vehicle using plural cameras and outputs the captured images.

The occupant driving operation section 18 includes a throttle pedal, a brake pedal, a steering wheel, and a display section provided in the vehicle installed with the onboard system 12. The occupant driving operation section 18 is operated by a driver on board the vehicle when the vehicle is in the occupant driving mode. The occupant driving operation section 18 includes sensors to detect operation amounts of the throttle pedal, the brake pedal, and the steering wheel, and outputs the operation amounts of the respective pedals and the steering wheel by the driver as occupant driving operation information.

The driver detection section 20 detects states of the driver operating the occupant driving operation section 18 when the vehicle is in the occupant driving mode. The states of the driver detected by the driver detection section 20 include, for example, biometric information regarding the driver such as the driver's pulse and blood pressure, the posture of the driver, such as whether or not the driver is gripping the steering wheel of the occupant driving operation section 18, and driver operation force, such as the force with which the driver steers the steering wheel of the occupant driving operation section 18. The driver detection section 20 determines whether or not a driver abnormality is present, for example by comparing detection results against threshold values for the driver states, and outputs an abnormality detection signal in cases in which a driver abnormality has been detected.

The driving operation ACTs 22 include a throttle ACT that changes the throttle opening amount of the vehicle, a brake ACT that changes braking force generated by a brake device of the vehicle, and a steering ACT that changes a steering amount of a steering device of the vehicle. The driving operation ACTs 22 further include a door opening/closing ACT that opens and closes the vehicle doors, and a trunk opening/closing ACT that opens and closes the vehicle trunk.

The driving control ECU 24 includes a central processing unit (CPU), memory such as read only memory (ROM) or random access memory (RAM), a non-volatile storage section such as a hard disk drive (HDD) or a solid state drive (SSD), and a communication I/F. The driving control ECU 24 functions as a remote driving operation information acquisition section 26, the autonomous driving control section 28, and a driving handover control section 30 illustrated in FIG. 1 by reading predetermined programs stored in the storage section into the memory and executing the programs using the CPU.

The remote driving operation information acquisition section 26 acquires remote driving operation information expressing an operation amount of the remote driving operation section 38, described later, of the corresponding fulfilment agent operation terminal 34 by a remote driver when the vehicle is in the remote driving mode.

The autonomous driving control section 28 performs autonomous driving control processing when the vehicle is in the autonomous driving mode. The autonomous driving control section 28 generates and outputs autonomous driving control information to control actuation of the respective ACTs of the driving operation ACTs 22 so as to cause the vehicle to travel autonomously, based on information expressing the situation in the surrounding environment of the vehicle as acquired by the plural types of sensors of the sensor group 16.

The driving handover control section 30 supplies occupant driving operation information output from the occupant driving operation section 18 to the driving operation ACTs 22 when the vehicle is in the occupant driving mode. The respective ACTs of the driving operation ACTs 22 are thus actuated according to operation of the occupant driving operation section 18 by the driver. When this is performed, the vehicle travels according to operation of the occupant driving operation section 18 by the driver on board the vehicle.

The driving handover control section 30 also supplies remote driving operation information acquired by the remote driving operation information acquisition section 26 to the driving operation ACTs 22 when the vehicle is in the remote driving mode. The respective ACTs of the driving operation ACTs 22 are thus actuated according to operation of the remote driving operation section 38 by a remote driver. When this is performed, the vehicle travels according to operation of the remote driving operation section 38 by the remote driver.

The driving handover control section 30 also supplies autonomous driving control information output from the autonomous driving control section 28 to the driving operation ACTs 22 when the vehicle is in the autonomous driving mode. The respective ACTs of the driving operation ACTs 22 are thus actuated according to the autonomous driving control of the autonomous driving control section 28. When this is performed, the vehicle travels according to autonomous driving control by the autonomous driving control section 28.

The driving handover control section 30 also controls handovers of driving of the vehicle by switching the driving mode of the vehicle as required. For example, in a case in which remote driving of the vehicle is handed from a remote driver A to a remote driver B from a state in which vehicle travel is being remotely driven by the remote driver A, switching the driving mode of the vehicle may involve temporarily switching from the remote driving mode with the remote driver A remotely driving the vehicle to the autonomous driving mode, and then switching back to the remote driving mode with the remote driver B remotely driving the vehicle. Moreover, for example, the driving handover control section 30 may also switch the driving mode of the vehicle in cases in which an abnormality detection signal has been output from the driver detection section 20 or from a remote driver detection section 40, described later.

The requester terminals 32 are terminals operated by requesters. Each of the requester terminals 32 includes a CPU, memory such as ROM or RAM, a non-volatile storage section such as an HDD or SSD, and a communication I/F, and is also provided with a display section such as a display and an input section configured by a keyboard, mouse, or the like. In the present exemplary embodiment, the requester issues a remote driving request requesting remotely-driven vehicle travel using the requester terminal 32. Note that in the present exemplary embodiment, the requester may be the owner of a vehicle installed with the onboard system 12, but does not have to be to the owner of the vehicle.

The fulfilment agent operation terminals 34 are terminals operated by fulfilment agents (remote drivers) who undertake a task corresponding to the remote driving request issued by the requester. Each of the fulfilment agent operation terminals 34 includes a fulfilment agent terminal 36, the remote driving operation section 38, and the remote driver detection section 40. These sections are connected together through a bus 41. The fulfilment agent terminal 36 includes a CPU, memory such as ROM or RAM, a non-volatile storage section such as an HDD or SSD, and a communication I/F, and is also provided with a display section such as a display and an input section configured by a keyboard, mouse, or the like.

The remote driving operation section 38 includes a throttle pedal, a brake pedal, a steering wheel, and a display section. The display section displays an image representing a situation in the surroundings of the vehicle, imaged by the cameras included in the sensor group 16 of the onboard system 12. The throttle pedal, the brake pedal, and the steering wheel of the remote driving operation section 38 are operated by the remote driver when the remote driver (fulfilment agent) is remotely driving a vehicle in the remote driving mode. The remote driving operation section 38 also includes sensors that detect respective operation amounts of the throttle pedal, the brake pedal, and the steering wheel, and transmit the operation amounts of the respective pedals and the steering wheel by the remote driver to the onboard system 12 as remote driving operation information.

The remote driver detection section 40 detects states of the remote driver operating the remote driving operation section 38, including for example biometric information regarding the remote driver, the posture of the remote driver, and operation force of the remote driver, in a similar manner to the driver detection section 20, when a vehicle is in the remote driving mode. The remote driver detection section 40 also determines whether or not a remote driver abnormality is present, for example by comparing detection results against threshold values for the remote driver states, and outputs an abnormality detection signal in cases in which a remote driver abnormality has been detected.

The server 46 includes a CPU 48, memory 50 such as ROM or RAM, a non-volatile storage section 52 such as an HDD or SSD, and a communication I/F 54. The CPU 48, the memory 50, the storage section 52, and the communication I/F 54 are connected together through a bus 56. The server 46 reads a predetermined program stored in the storage section 52 into the memory 50 and executes the program using the CPU 48 to perform processing, described later. Map information 53 is stored in the storage section 52. Note that the server 46 is an example of a remote driving request processing device.

Figure 2:
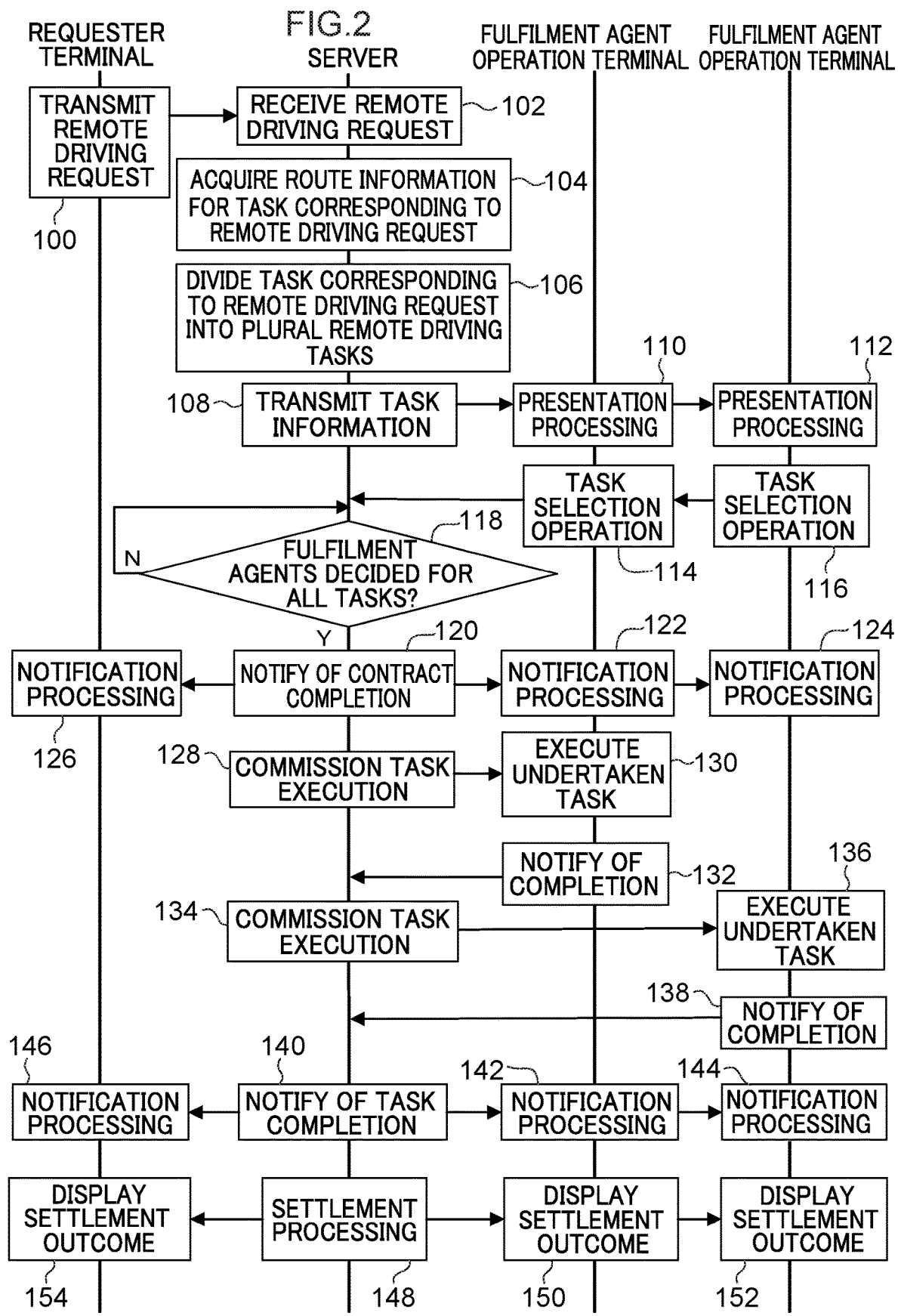
FIG. 2 is a sequence diagram illustrating a processing sequence according to an exemplary embodiment.

Explanation follows regarding a processing sequence according to the present exemplary embodiment serving as operation of the present exemplary embodiment, with reference to FIG. 2. When a requester wants to issue a remote driving request requesting vehicle travel by a remote driver, the requester operates the corresponding requester terminal 32 and inputs remote driving request information expressing contents of their desired remote driving request. The remote driving request information includes departure point and destination information, and information regarding the payment amount to the fulfilment agent who undertakes a task corresponding to the remote driving request. Note that examples of situations in which a requester may wish to issue a remote driving request include a situation in which the requester has been driving themselves, but the requester has become fatigued and wants a remote driver to take over driving of the vehicle. However, the requester is not limited to being on board the vehicle, and does not need to be on board the vehicle.

When the requester completes input of the remote driving request information, the requester instructs transmission of the remote driving request information. The corresponding requester terminal 32 thus transmits the remote driving request information (see also step 100 in FIG. 2), and the remote driving request information transmitted from the requester terminal 32 is received by the server 46 (see also step 102 in FIG. 2), thereby issuing the remote driving request from the requester. Note that step 102 is an example of processing performed by a reception section.

The server 46 references the departure point and destination included in the received remote driving request information against the map information 53, and acquires route information expressing a route of travel in a task corresponding to the remote driving request issued by the requester (see also step 104 in FIG. 2). As illustrated in FIG. 3A, as an example, the task route corresponding to the remote driving request issued by the requester is perceived as "a route departing from a parking area 64A of an expressway 62, traveling along the expressway 62 as far as an interchange 66, and then traveling along a general road 68 as far as a destination 70".

Next, the server 46 divides up the task corresponding to the remote driving request into plural remote driving tasks for remotely-driven vehicle travel, based on the task route corresponding to the remote driving request issued by the requester (see also step 106 in FIG. 2). This division of the task corresponding to the remote driving request is performed according to categories of roads of travel (for example expressways 62 and general roads 68), and the positions of potential stopping facilities (for example parking areas 64) on the roads of travel.

For example, in a case in which the task route corresponding to the remote driving request is the route illustrated in FIG. 3A, the server 46 divides the task corresponding to the remote driving request into the remote driving tasks 1 to 3 illustrated in FIG. 3B. The remote driving task 1 is a task of "remotely-driven travel along the expressway 62 from the parking area 64A to a parking area 64B", the remote driving task 2 is a task of "remotely-driven travel along the expressway 62 from the parking area 64B to the interchange 66", and the remote driving task 3 is a task of "remotely-driven travel along the general road 68 from the interchange 66 to the destination 70". Dividing the task corresponding to the remote driving request into plural remote driving tasks in this manner enables the likelihood of fulfilment agents being available to undertake the remote driving tasks to be increased. This processing is an example of processing by a division section. The server 46 then sets remuneration for each of the divided remote driving tasks.

Note that in cases in which a required duration for a task corresponding to the remote driving request is below a predetermined duration, or in cases in which a travel distance of a task corresponding to a remote driving request is below a predetermined distance, the division of the task corresponding to the remote driving request may be omitted. In such cases, tasks corresponding to a remote driving request can be suppressed from being divided into shorter tasks than necessary.

Next, the server 46 transmits information regarding the individual tasks divided from the task corresponding to the remote driving request to plural of the fulfilment agent operation terminals 34 (see also step 108 in FIG. 2). Note that there is no limitation to transmitting information regarding all of the divided tasks to all of the fulfilment agent operation terminals 34, and configuration may be such that information regarding at least one task out of the divided tasks is transmitted to at least one of the fulfilment agent operation terminals 34. For example, configuration may be made such that in cases in which individual fulfilment agents have indicated in advance the times during which they are available to undertake tasks, tasks are only transmitted to individual fulfilment agent operation terminals 34 when they correspond to the times that have been indicated as being available to undertake tasks. Step 108 is an example of processing by a transmission section.

The plural fulfilment agent operation terminals 34 that have received information regarding the individual tasks from the server 46 each perform presentation processing, for example to display the received information on the display section of the fulfilment agent terminal 36 (see also steps 110, 112 in FIG. 2). FIG. 4 illustrates an example of a presentation screen displayed on each of the display sections by this presentation processing. The presentation screen illustrated in FIG. 4 displays for each individual task a task type, a time commitment (timeframe), remuneration, and task contents, and also displays a button 60 to be operated in order to accept the task.

The fulfilment agents operating the individual fulfilment agent operation terminals 34 refer to the presentation screens displayed on the display sections to ascertain the task contents, time commitment, and remuneration for the individual tasks, and consider whether or not to undertake the respective tasks. When a fulfilment agent chooses to undertake a given task, the fulfilment agent performs a task selection operation to operate the button 60 corresponding to the task they have chosen to undertake (see also steps 114, 116 in FIG. 2). When a task selection operation is performed by a fulfilment agent on a given fulfilment agent operation terminal 34, information regarding the selected task and information regarding the fulfilment agent that performed the task selection operation is transmitted from the fulfilment agent operation terminal 34 to the server 46.

Each time the server 46 receives information from one of the fulfilment agent operation terminals 34, the server 46 determines whether or not a fulfilment agent to undertake the task has been decided for all of the tasks (see also step 118 in FIG. 2). Note that processing to receive information from the fulfilment agent operation terminals 34 is an example of processing by a reception section. When tasks for which fulfilment agents are yet undecided remain, the server 46 performs processing to remove the buttons 60 corresponding to any tasks for which fulfilment agents have been decided from the presentation screens displayed on the display sections of the individual fulfilment agent operation terminals 34.

When fulfilment agents have been decided for all of the tasks, the server 46 notifies the individual fulfilment agent operation terminals 34 operated by the fulfilment agents who are to undertake the respective tasks on this occasion, and also notifies the requester terminal 32 that transmitted the remote driving request with information that a contract has been entered into (see also step 120 in FIG. 2). The respective fulfilment agent operation terminals 34 and the requester terminal 32 accordingly perform notification processing to notify that the contract has been entered into (see also steps 122, 124, and 126 in FIG. 2).

The server 46 then transmits information to commission execution of the task to the fulfilment agent operation terminal 34 operated by the fulfilment agent who is to undertake a first task (the remote driving task 1 in the example in FIG. 3B) (see also step 128 in FIG. 2). The fulfilment agent who is to undertake the first task then executes the undertaken task by, for example, operating the remote driving operation section 38 such that the vehicle is remotely driven so as to travel along the expressway 62 in a segment from the parking area 64A to the parking area 64B (see also step 130 in FIG. 2). When the undertaken task has been completed, the fulfilment agent inputs task completion such that the fulfilment agent operation terminal 34 notifies the server 46 that the task has been completed (see also step 132 in FIG. 2).

On receipt of notification that the first task has been completed, the server 46 transmits information to commission execution of the task to the fulfilment agent operation terminal 34 operated by the fulfilment agent to undertake a second task (the remote driving task 2 in the example in FIG. 3B) (see also step 134 in FIG. 2). The fulfilment agent who is to undertake the second task then executes the undertaken remote driving task by, for example, operating the remote driving operation section 38 such that the vehicle is remotely driven so as to travel along the expressway 62 in a segment from the parking area 64B to the interchange 66 (see also step 136 in FIG. 2). When the undertaken remote driving task has been completed, the fulfilment agent inputs task completion such that the fulfilment agent operation terminal 34 notifies the server 46 that the task has been completed (see also step 138 in FIG. 2).

Commissions to execute tasks from the server 46 to the fulfilment agent operation terminals 34 are made repeatedly until all of the tasks have been completed. In the example in FIG. 3B, a third task is the remote driving task 3. When notified that the second task has been completed, the server 46 transmits information to commission execution of the task to the fulfilment agent operation terminal 34 operated by the fulfilment agent who is to undertake the third task (for example the remote driving task 3)

The fulfilment agent who is to undertake the third task thus executes the undertaken remote driving task by, for example, operating the remote driving operation section 38 such that the vehicle is remotely driven so as to travel along the general road 68 in a segment from the interchange 66 to the destination 70. When the undertaken remote driving task has been completed, the fulfilment agent inputs task completion such that the fulfilment agent operation terminal 34 notifies the server 46 that the task has been completed.

When all of the tasks have been completed, the server 46 notifies the individual fulfilment agent operation terminals 34 operated by the fulfilment agents who executed the respective tasks on this occasion and also notifies the requester terminal 32 that transmitted the remote driving request information that the task has been completed (see also step 140 in FIG. 2). The individual fulfilment agent operation terminals 34 and the requester terminal 32 accordingly perform notification processing to notify that the task has been completed (see also steps 142, 144, and 146 in FIG. 2).

The server 46 then performs settlement processing to pay the plural fulfilment agents that executed the respective tasks the remuneration using funds provided by the requester (see also step 148 in FIG. 2). Namely, the server 46 first performs processing to debit the payment amounts for the individual fulfilment agents that undertook the tasks corresponding to the remote driving request from an account belonging to the requester. The server 46 then performs processing to deposit the remuneration for the individual fulfilment agents that executed the tasks into accounts belonging to the individual fulfilment agents. The server 46 also transmits information to the individual fulfilment agent operation terminals 34 operated by the fulfilment agents who executed the respective tasks on this occasion and also to the requester terminal 32 that transmitted the remote driving request to notify of the outcome of the settlement processing. The individual fulfilment agent operation terminals 34 and the requester terminal 32 accordingly perform processing to display the outcome of the settlement processing (see also steps 150, 152, and 154 in FIG. 2).

In this manner, the server 46 of the present exemplary embodiment receives information regarding a remote driving request requesting remotely-driven vehicle travel from a requester terminal 32, and receives information regarding remote driving tasks selected using the fulfilment agent operation terminals 34 of the remote drivers (fulfilment agents) from the fulfilment agent operation terminals 34. The task corresponding to a received remote driving request is divided into plural remote driving tasks based on the information regarding the task route, and information regarding at least one out of the divided remote driving tasks is transmitted to at least one out of the fulfilment agent operation terminals 34. The divided remote driving tasks are more likely to be executed by remote drivers, thereby enabling the likelihood of a remote driving request from a requester being unfulfilled to be lowered.

In the present exemplary embodiment, the task corresponding to the remote driving request is divided into plural remote driving tasks according to the category of roads of travel based on information regarding the task route. Since the driving conditions encountered in a single remote driving task are thereby constant, the burden on the remote drivers executing the individual remote driving tasks can be alleviated.

In the present exemplary embodiment, the task corresponding to the remote driving request is also divided into plural remote driving tasks according to the positions of potential stopping facilities on the roads of travel based on information regarding the task route. This enables a change-over between remote drivers to be performed safely in a state in which the vehicle has stopped at a potential stopping facility.

Although explanation has been given regarding an embodiment in which the task corresponding to the remote driving request is divided into plural remote driving tasks, and execution of the first remote driving task is commissioned after the fulfilment agents for all of the divided remote driving tasks have been decided, there is no limitation thereto. Alternatively, execution of the first remote driving task may be commissioned when the fulfilment agent for at least the first remote driving task of the divided remote driving tasks has been decided, and fulfilment agents for remote driving tasks for which fulfilment agents are yet undecided may be decided in parallel with execution of the first remote driving task.

Although explanation has been given regarding an embodiment in which the task corresponding to the remote driving request is divided according to the category of roads of travel and the positions of potential stopping facilities on the roads of travel, there is no limitation thereto. For example, the task corresponding to the remote driving request may be divided at administrative boundaries.

Although explanation has been given regarding a configuration in which the remote driving request processing system 10 is configured based on a client-server model as an example, there is no limitation thereto. For example, a configuration may be adopted in which the server 46 is omitted, and the processing according to the present disclosure is realized by the requester terminals 32 and the fulfilment agent operation terminals 34 performing peer-to-peer communication with each other. In such cases, the requester terminals 32 and the fulfilment agent operation terminals 34 function as the remote driving request processing device according to the present disclosure.

The invention claimed is:

1. A remote driving request processing device comprising a processor that is configured to:
   receive information regarding a remote driving request requesting a vehicle to travel by being remotely driven from a terminal of a requester, and receive information regarding a remote driving task selected using a terminal of at least one remote driver from the terminal of the at least one remote driver;
   divide a task corresponding to the received remote driving request into a plurality of remote driving tasks based on route information for the task, such that the plurality of remote driving tasks are respectively capable of being performed by different remote drivers; and
   a transmission section configured to transmit information regarding at least one of the divided remote driving tasks to the terminal of the at least one remote driver.

2. The remote driving request processing device of claim 1, wherein the processor divides the task corresponding to the remote driving request into a plurality of remote driving tasks according to a category of road of travel based on the route information for the task.

3. The remote driving request processing device of claim 2, wherein, at a point in time when the at least one remote driver has selected at least one of the divided remote driving tasks based on the transmitted information regarding the remote driving tasks and a remote driver from the at least one remote driver has been decided for all of the divided remote driving tasks, the processor notifies the terminal of the requester and the terminal of the remote driver that a contract has been entered into, and commissions the remote driver that selected the remote driving task divided by the division section to execute the remote driving task according to a route sequence of the task.

4. The remote driving request processing device of claim 2, wherein, at a point in time when the at least one remote driver has selected at least one of the divided remote driving tasks based on the transmitted information regarding the remote driving tasks and a remote driver from the at least one remote driver has been decided for at least one of the divided remote driving tasks, the processor notifies the terminal of the requester and the terminal of the remote driver that a contract has been entered into, and commissions the remote driver that selected the remote driving task to execute the remote driving task.

5. The remote driving request processing device of claim 4, wherein, when the remote driver has been decided for at least a first remote driving task out of the divided remote driving tasks, the processor commissions the remote driver to execute the first remote driving task, and decides a remote driver from the at least one remote driver for a remote driving task for which a remote driver is yet undecided in parallel with execution of the first remote driving task.

6. The remote driving request processing device of claim 1, wherein the processor divides the task corresponding to the remote driving request into a plurality of remote driving tasks according to positions of potential stopping facilities on a road of travel based on the route information for the task.

7. The remote driving request processing device of claim 6, wherein, at a point in time when the at least one remote driver has selected at least one of the divided remote driving tasks based on the transmitted information regarding the remote driving tasks and a remote driver from the at least one remote driver has been decided for all of the divided remote driving tasks, the processor notifies the terminal of the requester and the terminal of the remote driver that a contract has been entered into, and commissions the remote driver that selected the remote driving task divided by the division section to execute the remote driving task according to a route sequence of the task.

8. The remote driving request processing device of claim 6, wherein, at a point in time when the at least one remote driver has selected at least one of the divided remote driving tasks based on the transmitted information regarding the remote driving tasks and a remote driver from the at least one remote driver has been decided for at least one of the divided remote driving tasks, the processor notifies the terminal of the requester and the terminal of the remote driver that a contract has been entered into, and commissions the remote driver that selected the remote driving task to execute the remote driving task.

9. The remote driving request processing device of claim 8, wherein, when the remote driver has been decided for at least a first remote driving task out of the divided remote driving tasks, the processor commissions the remote driver to execute the first remote driving task, and decides a remote driver from the at least one remote driver for a remote driving task for which a remote driver is yet undecided in parallel with execution of the first remote driving task.

10. The remote driving request processing device of claim 1, wherein the processor divides the task corresponding to the remote driving request into a plurality of remote driving tasks according to administrative boundaries based on the route information for the task.

11. The remote driving request processing device of claim 10, wherein, at a point in time when the at least one remote driver has selected at least one of the divided remote driving tasks based on the transmitted information regarding the remote driving tasks and a remote driver from the at least one remote driver has been decided for all of the divided remote driving tasks, the processor notifies the terminal of the requester and the terminal of the remote driver that a contract has been entered into, and commissions the remote driver that selected the remote driving task divided by the division section to execute the remote driving task according to a route sequence of the task.

12. The remote driving request processing device of claim 10, wherein, at a point in time when the at least one remote driver has selected at least one of the divided remote driving tasks based on the transmitted information regarding the remote driving tasks and a remote driver from the at least one remote driver has been decided for at least one of the divided remote driving tasks, the processor notifies the terminal of the requester and the terminal of the remote driver that a contract has been entered into, and commissions the remote driver that selected the remote driving task to execute the remote driving task.

13. The remote driving request processing device of claim 12, wherein, when the remote driver has been decided for at least a first remote driving task out of the divided remote driving tasks, the processor commissions the remote driver to execute the first remote driving task, and decides a remote driver from the at least one remote driver for a remote driving task for which a remote driver is yet undecided in parallel with execution of the first remote driving task.

14. The remote driving request processing device of claim 1, wherein, at a point in time when the at least one remote driver has selected at least one of the divided remote driving tasks based on the transmitted information regarding the remote driving tasks and a remote driver from the at least one remote driver has been decided for all of the divided remote driving tasks, the processor notifies the terminal of the requester and the terminal of the remote driver that a contract has been entered into, and commissions the remote driver that selected the remote driving task divided by the division section to execute the remote driving task according to a route sequence of the task.

15. The remote driving request processing device of claim 1, wherein, at a point in time when the at least one remote driver has selected at least one of the divided remote driving tasks based on the transmitted information regarding the remote driving tasks and a remote driver from the at least one remote driver has been decided for at least one of the divided remote driving tasks, the processor notifies the terminal of the requester and the terminal of the remote driver that a contract has been entered into, and commissions the remote driver that selected the remote driving task to execute the remote driving task.

16. The remote driving request processing device of claim 15, wherein, when the remote driver has been decided for at least a first remote driving task out of the divided remote driving tasks, the processor commissions the remote driver to execute the first remote driving task, and decides a remote driver from the at least one remote driver for a remote driving task for which a remote driver is yet undecided in parallel with execution of the first remote driving task.

* * * * *